United States Patent [19]

Su

[11] Patent Number: 4,834,928
[45] Date of Patent: May 30, 1989

[54] DOPED SILICON NITRIDE ARTICLE

[75] Inventor: Sophia R. Su, Weston, Mass.

[73] Assignee: GTE Laboratories Incorporated, Waltham, Mass.

[21] Appl. No.: 73,291

[22] Filed: Jun. 29, 1987

Related U.S. Application Data

[63] Continuation of Ser. No. 761,457, Aug. 1, 1985, abandoned.

[51] Int. Cl.$^4$ .............................................. C04B 35/58
[52] U.S. Cl. .................................... 264/56; 264/65; 501/12; 501/97; 501/98
[58] Field of Search ............ 264/65, 56; 501/12, 501/97, 98

[56] References Cited

U.S. PATENT DOCUMENTS

| | | | |
|---|---|---|---|
| 4,098,612 | 7/1978 | Rhodes et al. | 106/73.2 |
| 4,266,978 | 5/1981 | Prochazlea | 106/39.5 |
| 4,286,024 | 8/1981 | Yoldas | 428/446 |
| 4,429,051 | 1/1984 | Davidge et al. | 501/12 |
| 4,443,339 | 4/1984 | Rosevicar | 210/635 |
| 4,472,510 | 9/1984 | January | 501/12 |
| 4,501,818 | 2/1985 | Rossi | 501/1 |
| 4,543,341 | 9/1985 | Barringer et al. | 264/56 |

FOREIGN PATENT DOCUMENTS

| | | | |
|---|---|---|---|
| 59-195574 | 11/1984 | Japan | 501/12 |
| 2011952 | 7/1979 | United Kingdom | 501/97 |

OTHER PUBLICATIONS

Shaw, T. M. and Pethica B., The Preparation and Sintering of Homogeneous Silicon Nitride Green Compacts, Jun. 1985

Szweda, A.; Hendry, A.; Jack, K. H. "The Preparation of Silicon Nitride from Silica by Sol–Gel Processing;" Proc. Br. Ceram. Soc., 1981, 31, No. Spec Ceram. 7 pp. 107–118.

*Primary Examiner*—James Derrington
*Attorney, Agent, or Firm*—Ivan L. Ericson

[57] ABSTRACT

A process for making a homogeneous yttria-alumina doped silicon nitride article is described. A uniform coating of yttria and alumina is applied to the surface of silicon nitride particles by a chemical application of the nitrates of yttrium and aluminum followed by drying and a subsequent conversion of the nitrates to the corresponding oxides. The resulting powder is formed into an article and pressureless sintered to a density greater than 98% of theoretical at temperatures less than 1700° C.

11 Claims, No Drawings

DOPED SILICON NITRIDE ARTICLE

This is a continuation of co-pending application Ser. No. 761,457, filed on Aug. 1, 1985, now abandoned.

FIELD OF THE INVENTION

This invention relates to a method of making a ceramic article. More particularly, this invention relates to a method of making a silicon nitride article having homogeneously dispersed sintering additives.

BACKGROUND OF THE INVENTION

A major problem in ceramic processing is the capability of manufacturing reproducible and reliable ceramic materials having the required properties suitable for high technology applications. This lack of reproducibility of material properties lies in the inability to control the development of specified microstructure, which for sintered materials depend on the characteristics of the starting powder, the green compact microstructure, and the sintering and coarsening processes. Although much significant work has been performed on the process which occurs during firing many researchers believe that the microstructure developed during sintering is determined to a large extend by the powder characteristics and the green microstructure. Therefore, the key factor to stronger and more reliable ceramics lies in new processing techniques that would result in fewer of the flaws and voids that lead to failure.

SUMMARY OF THE INVENTION

In accordance with the present invention, a new and improved process for making a silicon nitride article having homogeneously dispersed sintering additives comprises the following steps:

Step 1—Silicon nitride particles are dispersed in a dispersion reagent to form a silicon nitride slurry.

Step 2—A solution of sintering additive is added to the silicon nitride slurry to form a homogeneous slurry having a pH less than 7.

Step 3—The product from step 2 is dried to form a dried powder which has an essentially uniform coating of the sintering additives on the silicon nitride particles.

Step 4—The sintering additives of the product from step 3 are converted to their corresponding oxides.

Step 5—The product from step 4 is formed into a silicon nitride article.

Step 6—The product from step 5 is pressureless sintered at a temperature less than 1700° C. to form a densified silicon nitride article which has a density greater than 98 percent of theoretical density.

DETAILED DESCRIPTION OF THE INVENTION

Two $Si_3N_4$ based formulations, one having 6 w/o $Y_2O_3$ as a sintering aid, designated as $PY_6$, and the other having and 6 w/o $Y_2O_3$ and 2 w/o $Al_2O_3$ as sintering aids and designated as AY6, were used to illustrate the advantages of the new and improved processes of the present invention. The processing technique can be applied to other systems in which oxides are used as sintering additives.

One Powder Processing method is based on the use of inorganic salts of the sintering aids.

This method is based on the addition of aqueous solutions of sintering additives such as aluminum nitrate and yttrium nitrate for AY6 formulations or yttrium nitrate for PY6 formulations to a slurry of a dispersed $Si_3N_4$ powder. Other sintering additives such as the soluble salts of magnesium, lanthanum, cerium, hafnium, zirconium, and the rare earths can be used.

In general, premilled $Si_3N_4$ powders are dispersed in high dielectric constant solutions by the use of an ultrasonic liquid processor and/or wet-milling techniques. The dispersion agents can be low molecular weight alcohols, acetone, weak alkali media such as $NH_4OH$, or weak acidic media such as 1 w/o ammonium citrate solution. The resulting dispersion containing a nitrate solution of sintering additives has a pH less than 7.0 and a slip density of about 1.3 g/l with a solids loading from about 30 to 35 volume percent solids loading. This dispersion is then spray dried or pan dried to produce loosely agglomerated powders, spherical in the case of spray dried powders, followed by calcination at 400°–500° C. under $N_2$/air to decompose nitrates to their corresponding oxides. The powder so prepared has a surface area which is 1.5 to 3.0 times higher than those of the conventional ball milled material. A billet, prepared by isostatic pressing, slip-cast forming techniques, can be sintered to about 98.0% of theoretical density at a temperature less than 1700° C. and at an ambient pressure with improved strength and reliability. Besides nitrates, other inorganic salts can also be applied to this method such as acetates, oxalates, and lactates.

Another method utilizing Metal Alkoxides Precursors is based on the polymerization (i.e. hydrolysis and polycondensation) reactions of aluminum alkoxides (aluminum ethoxide, aluminum isopropoxide or aluminum tetrabutoxide) with yttrium isopropoxide in the presence of a limited amount of $H_2O$ to produce an inorganic gel probably with networks like Si—O—Y—O—Si—O—Al for the AY6 formulation. The advantage of this method is that all the desired multi-component oxides can be produced with well defined stoichiometry after hydrolysis and polycondensation. In general, the glassy phase prepared from this method can be formed at a much lower processing temperature.

For example:

The alkoxide precursors are added to a well dispersed alcohol solution of $Si_3N_4$.

An inorganic polymer is formed on the $Si_3N_4$ particles by the hydrolysis of the alkoxides. The $Si_3N_4$ is homogeneously coated with oxides of the sintering additives after a calcination step which converts the inorganic polymers to their corresponding oxides.

The calcined powder is then formed into pellets or billets and pressureless sintered to form densified articles.

The results of sinterability studies of the processed AY6 materials formed as pellets and as billets are tabulated in Table I and Table II, respectively. Results indicate that the powders processed by the new and improved process are more reactive, and that the pellets can be sintered to theoretical density at 1710° C. under 200 psi $N_2$ regardless of the density of the green pellet. The superiority of the powder is evident at lower sintering temperature and pressure. Pellets were sintered to greater than 99.0% at 1750° C. under 60 psi $N_2$ pressure as compared to 97.5% for the control lot which used conventional ball milled powders. In general, this new chemical processing of sintering additives of $Si_3N_4$ provides technical potential in terms of sinterability at reduced temperature, pressure and in terms of grain size control of the sintered compact. The mechanical properties of these billets, AY6, PY6, sintered at new sintering schedules have been evaluated from ambient to 1200° C. The results are comparable to those data obtained from billets processed from conventional ball milled powders and sintered at 1850°, 200 psi $N_2$ overpressure for AY6 material and 1900°, 200 psi $N_2$ overpressure for PY6, but with higher reliability.

Examples of the Experimental Procedure:

General: The $Si_3N_4$ powder used in this invention was produced by GTE Products Corporation designated as SN502. The SN502 powder is a high purity material produced by the reaction between $SiCl_4$ and $NH_3(g)$. The powder is a crystalline material consisting of equal to or less than 92% of alpha-$Si_3N_4$, 7% beta-$Si_3N_4$, and less than 1% free Si. The surface area is about 2.5-4.0 $m^2/g$. Yttrium nitrate (99.9% purity) and reagent grade aluminum nitrate purchased from AESAR Johnson Mathy, Inc./Aldrich were used to prepare sintering additives.

The raw SN502 powder was usually milled with 4.0 weight percent stearic acid for 48 hrs. to 72 hrs. with $Si_3N_4$ milling media in a Scott Murray mill. The milled powder was then sifted through a 50 mesh screen followed by the removal of stearic acid at 500° C. prior to chemical processing. The particle distribution of the milled SN502 is from 0.1 to 12 microns with 50 weight percent less than 0.6 microns, and 85 weight percent less than 2.0 microns. After processing, the typical particle size distribution is from 0.8 microns to 20 microns with 50 weight percent less than 5 microns 85 weight percent less than 10 microns.

Preparation of Sintering Aid Formulations:

A formulation of silicon nitride having 6 w/o $Y_2O_3$ and 2 w/o $Al_2O_3$ is designated as AY6 and silicon nitride having 6 w/o $Y_2O_3$ is designated as PY6.

In the case of PY6, 37.0 g of SN502 silicon nitride powder prepared as described above was combined with 100 ml 1 w/o ammonium citrate solution, 27.5 ml of yttrium nitrate solution at a concentration equivalent to 86.6 g/l of $Y_2O_3$, and 72 ml $H_2O$. The mixture was ultrasonically dispersed using a Model W375 ultrasonic liquid processor from Heat Systems Ultra-Sonics Inc. for 30 minutes to thoroughly disperse the silicon nitride powder. The final pH of the slurry was 1.87. The resulting slurry having about 30 w/o powder loading was spray dried at about 190° C. to 200° C. and at a feed rate of 200 ml/hr. with a Büchi 190 Mini Spray Dryer. The spray dried powder was than calcined at 450° C. for 2½ hours to convert the nitrate to the oxide of yttrium.

In the case of AY6, 500 g of SN502 silicon nitride powder prepared as described above was combined with 2.5 g ammonium citrate, 377 ml of yttrium nitrate solution at a concentration equivalent to 86.8 g/l of $Y_2O_3$, 460 ml of aluminum nitrate solution containing an equivalent to 24.0 g/l of $Al_2O_3$, and 400 ml of 1N ammonium hydroxide solution. The mixture was set milled with $Si_3N_4$ milling media for 16 hrs. The slurry was sifted through a 350 mesh screen. The density of the slurry is about 1.3 g/ml. The final pH of the slurry was 5.60. The resulting slurry having about 35% powder loading was spray dried at about 190° C. to 200° C. and at a feed rate of 2 l/hr. with a Anhydro Spray Dryer or at 200 ml/hr. with a Büchi 190 Mini Spray Dryer. The spray dried powder was then calcined at 500° C. for 2½ hours to convert the nitrates to the oxides of yttrium and aluminum.

The surface area of the resultant chemically processed powder is in the range of 18.0 $m^2/g$ to 22.0 $m^2/g$ compared to those of a conventional ball milled material which is in the range of 12.0 $m^2/g$ to 13.0 $m^2/g$.

Pellets prepared without binder: Small pellets, 1.25 cm diameter, weighing about 1 gram were pressed at 210 $MNm^{-2}$ (30,000 psig) in WC dies. The green density of the pellet so prepared was in the 50.0 to 55.0% theoretical density region which is generally lower than those of pellets pressed with stearic acid as binder.

Pellets with binder: The chemical processed spray dried powder was wet milled with 4 w/o stearic acid in a methanol/toluene mixture for 1 hr. then followed by drying in air at 50° C. to 60° C. to remove the solvent. The dried powder was sifted through a 200 mesh screen prior to die pressing 1.25 cm diameter pellets at 20,000 to 50,000 psig. The pellets so prepared have a density in the range of 66.5 to 68.0% of T.D. Oleic acid was also used as a binder.

Preparation of Billets in AY6 and PY6 Formulation:

Two forming techniques were used to prepare ($1\frac{3}{4}'' \times 1\frac{1}{2}'' \times \frac{1}{4}''$) billets, isostatic pressing and slip casting.

A. Isostatic pressing: 20 to 23 grams of the chemical processed spray dried AY6/PY6 powders with 4 w/o stearic acid was isostatically pressed in a rubber mold at 170 $MNm^{-2}$ (25,000 psi). The billet was then dried in a desicator, and the binder was removed by heating at 450° C. The green density of the resultant billet is usually in the 65.0 to 67.0% theoretical density region.

B. Slip-cast: The slip-casting technique involved suspending 20 g of the milled particles in 9 g of slip solution containing carbowax, ammonium hydroxide, and ammonium citrate followed by uniaxial deposition of these particles into a bed formed against a material permeable to the suspending medium. The technique is akin to a "colloidal filtration" process. The billet ($1\frac{3}{4}'' \times 1\frac{1}{2}'' \times \frac{1}{4}''$) was then dried in a desicator overnight (12 hrs.), then followed by a binder removal procedure. The green density of the resultant billet is from about 65.0 to about 67.0% of theoretical density.

Sintering

The sintering procedure used was to place a graphite boat containing the AY6/PY6 samples into a cold sintering furnace. The furnace was evacuated and filled with nitrogen three times to remove air. The furnace was raised to the selected isothermal sintering temperature at a rate of about 30° C. per minute with a nitrogen flow. To determine the sintering behavior, time zero was the point at which the isothermal hold temperature was reached. Temperatures were controlled with a microoptical pyrometer. Densities after sintering were determined by immersion in water. X-ray diffraction analysis was conducted with Cu-K alpha radiation.

Mechanical Property Evaluation:

Molulus of rupture bars were diamond sawed from the densified shapes and surface ground to a 320 grit finish. Most strength test bars were $0.05 \times 0.10 \times 1.0''$ dimension, and were tested at room temperature, 1000° C., 1200° C., and 1400° C., respectively. The resultant modulus of rupture data were analyzed with Weibull Statistics having a computer program which calculates the Weibull parameter (m) by least-squares fit.

EXAMPLES

Example 1—Refer to samples 1 to 4 in Table 1. Small pellets, 1.25 cm diameter, weight about 1.0 g, were pressed at 210 $MNm^{-2}$ (30,000 psi) in WC dies. The green densities of the pellets so prepared were about 51.0% to about 54.6% of theoretical density. The pellets were sintered to greater than 99% of theoretical density at 1760° C. using a 200 psi N$_2$ overpressure. The sintering schedule was: holding at 1400° C. for 1 hr. followed by holding at the sintering temperature for 2 hrs.

Example 2. Refer to Samples 5 to 16 in Table I. The chemical processed powder in AY6 formulation was milled with 4 w/o stearic acid prior to die press 1.25 cm in diameter pellets at 20,000 to 50,000 psig. The pellets so prepared have green density in the range of 66.5 to 68.0% of T.D. Binder removal procedure was then followed. The sintering schedule was the same as Example 1.

Example 3. Three isostatically pressed AY6 billets were prepared as previously described in section (A.-Isostatic pressing:). The billets were sintered at 1765° C., with about 43 psi to about 46 psi N$_2$ overpressure. The sintering schedule was as follows: 1 hr. holding at 1400° C. and 3 hrs. holding at the sintering temperature. The results are tabulated as follows:

Sintering Conditions

| *Sample | Temp. °C. Temperature | N$_2$ Pressure (psi) at Sintering Temp. | Forming Technique | Sintered Density (% T.D.) | % Weight Loss |
|---|---|---|---|---|---|
| 1 | 1765 | 43 | isopressed | 99.4 | 3.12 |
| 2 | 1765 | 43 | isopressed | 99.1 | 3.25 |
| 3 | 1765 | 46 | isopressed | 99.8 | 2.88 |

*SN502 powder lot SN66

Example 4. One slip-cast AY6 billet was prepared as previously described in section B. Slip-cast. The chemical processed powder was premilled overnight prior to preparing the suspension. This billet was sintered at 1765° C. using a 43 psi N$_2$ overpressure. The sintered density was 99.73% of theoretical density (based on AY6 3.262 g/ml). (SN502 powder lot SN66)

TABLE I

SINTERING STUDIES OF SPRAY DRIED CHEMICAL PROCESSED AY6 PELLETS
(All SN502 lot 02-24)

| Sample No. | Density of Green Pellets (% T.D.) | Sintering Conditions Temp. (°C.) | N$_2$ Pressure at Sintering Temp. (psi) | Sintering Density % of T.D. | X-ray Diffraction |
|---|---|---|---|---|---|
| Example 1: | | | | | |
| 1 | *52.2 | 1860 | 200 | 99.8 | Single phase β-S$_3$N$_4$ |
| 2 | *55.7 | 1860 | 200 | 99.9 | |
| 3 | *51.0 | 1760 | 200 | 98.5 | Single phase β-Si$_3$N$_4$ |
| 4 | *54.6 | 1760 | 200 | 98.7 | |
| Example 2: | | | | | |
| 5 | 67.1 | 1760 | 200 | 98.7 | |
| 6 | 66.7 | 1735 | 200 | 99.0 | Single phase β-Si$_3$N$_4$ |
| 7 | 68.0 | 1735 | 200 | 98.8 | |
| 8 ball milled control sample | 66.8 | 1735 | 200 | 96.5 | |
| 9 | 66.5 | 1720 | 200 | 99.3 | Major phase β-Si$_3$N$_4$ detectable amount of α-Si$_3$N$_4$ |
| 10 | 67.5 | 1710 | 200 | 99.4 | Major phase of β-Si$_3$N$_4$ detectable amount Si$_2$N$_2$O |
| 11 ball milled control sample | 67.1 | 1710 | 200 | 95.8 | Major phase β-Si$_3$N$_4$ weak phase Si$_2$N$_2$O |
| 12 | 66.8 | 1750 | 60 | 99.5 | |
| 13 | 67.1 | 1750 | 60 | 98.9 | |
| 14 ball milled control sample | 67.0 | 1750 | 60 | 97.5 | |
| 15 | 66.5 | 1740 | 40 | 98.1 | |
| 16 ball milled control sample | 67.0 | 1740 | 40 | 97.0 | |

Example 5. Three slip-cast AY6 billets were prepared. These billets were sintered at 1765° C., using a 12 psi N$_2$ overpressure. The sintered densities were greater than 99% of theoretical density.

| Sample No. | Temperature °C. | Overpressure N$_2$ (psi) | Sintered Density % T.D. | % Weight Loss |
|---|---|---|---|---|
| 1. | 1765 | 12 | slip-cast 99.6 | 2.42 |
| 2. | 1765 | 12 | slip-cast 99.3 | 2.18 |
| 3. | 1765 | 12 | slip-cast 99.2 | 2.14 |
| 4. | 1765 | 12 | slip-cast 98.7 | 1.79 | control ball-milled AY6

Example 6. Two slip-cast AY6 billets were sintered at 1690° C. using a 12 psi N$_2$ overpressure. The sintered density was in the 98.0–98.4% region of theoretical density.

| Sample No. | Sintering Conditions | Sintered Density % T.D. | XRD (X-ray diffraction) |
|---|---|---|---|
| 1. | 1690° - 12 psi | 98.4% | beta-Si$_3$N$_4$ |
| 2. | 1690° - 12 psi | 98.0% | beta-Si$_3$N$_4$ |

Example 7. One slip-cast AY6 billet was sintered at 1690° C., ambient pressure with continuous N$_2$ flow. The sintered density was 98.0% of theoretical density. XRD indicates that a complete alpha to beta-Si$_3$N$_4$ phase transition was achieved.

Example 8. Two slip-cast PY6 billets (6.0 w/o Y$_2$O$_3$) were sintered at 1850° C. using from 55 to 60 psi N$_2$ overpressure. The sintered densities were from 97.0% to 98.2% of theoretical density.

| Sample No. | Sintering Conditions | Sintered Density % T.D. | XRD |
|---|---|---|---|
| 1. | 1850° C. - 55 psi $N_2$ | 98.2% | Beta-$Si_3N_4$ |
| 2. | 1850° C. - 60 psi $N_2$ | 97.0% | Beta-$Si_3N_4$ |

Example 9. Mechanical test data for AY6 billets sintered at 1755° C. using 12 psi $N_2$ overpressure, and sintered at 1690° C. using ambient pressure are tabulated as follows:

| Material | Sintering Conditions | Sintered Density % T.D. | Modulus of Rupture (Ksi) Ambient | 1000° C. | 1200° C. |
|---|---|---|---|---|---|
| AY6 | 1765° C. - 12 psi $N_2$ Overpressure | 99.5–99.8 | 117 | 101 | 63 |
| AY6 | 1690° C. - ambient pressure | 98.0–98.4 | 107 | 101 | 63 |

Example 10. Mechanical test data for PY6 billets sintered at 1850° C. using 55 psi–60 psi $N_2$ overpressure are summarized as follows:

| Material | Sintering Conditions | Sintered Density % T.D. | Modulus of Rupture (ksi) Ambient | 1000° C. | 1200° C. |
|---|---|---|---|---|---|
| PY6 | 1850° - 60-55 psi $N_2$ pressure | 97.0–98.2 | 100 | 67 | 65 |

Charts A. and B. illustrate the sintering study of pellets of chemically processed pan-dried AY6 material vs. control-conventional ball-milled powders.

| Temperature | $N_2$ Overpressure | Chemically Processed AY6 Sintered Density | Control Sintered Density |
|---|---|---|---|
| A. Setter Powder - SN502 + 0.5 w/o $Al_2O_3$ | | | |
| 1850° | 200 psi* | 99.8 | 99.2 |
| 1810° | 200 psi | 97.2 | 96.6 |
| 1760° | 200 psi | 97.4 | 97.0 |
| 1700° | 200 psi | 97.2 | 95.8 |
| 1815° | 60 psi** | 99.4 | 99.4 |
| 1725° | 60 psi | 93.4 | 89.4 |
| 1710 | 60 psi | 91.8 | 87.1 |
| B. Setter Powder - AY6 + 1.5 w/o $Y_2O_3$ | | | |
| 1850° | 200 psi* | 99.1 | 98.9 |
| 1725° | 200 psi | 97.9 | 96.5 |
| 1825° | 60 psi** | 98.1 | 98.1 |
| 1725° | 60 psi | 94.4 | 90.3 |

*SN502-02-24 was used at 200 psi $N_2$ overpressure sintering study.
**SN502-02-37 was used at 60 psi $N_2$ overpressure sintering study.

The mechanical strength of chemically processed (pan dried AY6) billet vs. billet prepared from conventional ball-milled powders is illustrated:

The powder lot SN502-02-24.
Slip-casting was the consolidation technique.
The sintering condition was: 1850° C. using 200 psi $N_2$ overpressure. Two billets were sintered in the same boat.

| Sample | Modulus of Rupture RT | 1000° C. | 1200° C. |
|---|---|---|---|
| Chemically processed pan dried AY6 | 110 ksi (101.5–122) | 95. ksi (92–98) | 64 ksi (55–70) |
| Control AY6 | 90 | 86 | 53 |
| | (84–101) | (80–95) | (52–55) |

The chemically processed AY6 (Spray Dried) billets vs. billets prepared from conventional ball-milled powders is illustrated:

The sintering conditions were: 1765° C. using 40–45 psi $N_2$ overpressure, holding at 1400° C. for 1 hr. and holding at the sintering temperature for 3 hrs.

The powder lot was: SN60-63, and the consolidation technique used was isostatical pressing.

| Sample | Sintered Density % T.D. | MOR at ambient | Weirbull |
|---|---|---|---|
| Chemically processed | 99.0 | 114 Ksi (102–127, 9 bars) | 13 |
| Control | 98.5 | 96 Ksi (67–110, 10 bars) | 6 |

TABLE II

Sintering Study of Chemically Processed Spray Dried AY6 Billets

| Sample | Powder Lot | Sintering Conditions | Consolidation Technique | Sintered Density (% T.D.) |
|---|---|---|---|---|
| 1. | SN66 | 1 hr. 1400° C., 4 hrs. at 1765° C., 40–45 psi $N_2$ overpressure | isopressed | 99.4 |
| 2. | SN66 | 1 hr. 1400° C., 4 hrs. at 1765° C., 40–45 psi $N_2$ overpressure | isopressed | 99.1 |
| 3. | SN66 | 1 hr. 1400° C., 4 hrs. at 1765° C., 40–45 psi $N_2$ overpressure | isopressed | 99.8 |
| 4. | SN66 | 1 hr. 1400° C., 4 hrs. at 1765° C., 40–45 psi $N_2$ overpressure | slip-cast | 99.7 |
| 5. | SN60-63 | 1 hr. 1400° C., 4 hrs. at 1765° C., 12 psi $N_2$ overpressure | slip-cast | 99.6 |
| 6. | SN66 Control AY6 | 1 hr. 1400° C., 4 hrs. at 1765° C., 12 psi $N_2$ overpressure | slip-cast | 98.7 |
| 7. | SN66 | 1 hr. 1400° C., 4 hrs. at 1765° C., 12 psi $N_2$ overpressure | slip-cast | 99.3 |
| 8. | SN66 | 1 hr. 1400° C., | slip-cast | 99.6 |

TABLE II-continued
Sintering Study of Chemically Processed Spray Dried AY6 Billets 4 hrs. at 1765° C., 12 psi N₂ overpressure The Mechanical Strength of Chemically processed AY6 billets sintered at 1765° C. using 12 psi N₂ overpressure follows:

| | Density % T.D. | MOR Strength ksi | | |
|---|---|---|---|---|
| | | Ambient | 1000° C. | 1200° C. |
| Chemically processed (SN66) | 99.3 | 104 (95–115, 6 bars) | 103 (94–108, 6 bars) | 69 (65–77, 7 bars) |
| Control AY6 (SN66) | 98.7 | 99.4 (90–107, 4 bars) | 91 (84–99, 4 bars) | 68 (62–70, 3 bars) |
| Chemically processed (SN60-63) | 99.6 | 111 (98–121, 4 bars) | 102 (97–107, 4 bars) | 66 (65–68, 2 bars) |
| Chemically processed (SN60-63) | 99.5 | 118 (109–124, 7 bars) | 103 (92–110, 7 bars) | 63 (62–64, 4 bars) |

The Mechanical Strength of Chemically processed AY6 billets sintered at 1690° C. using 6–12 psi N₂ overpressure follows:

| Sample | Density | MOR Strength ksi | | |
|---|---|---|---|---|
| | | Ambient | 1000° C. | 1200° C. |
| Chemically processed AY6 spray dried | 98.0–98.4% | 104 ksi (91–112, 13 bars) | 101 ksi (93–111, 6 bars) | 63 ksi (57–66, 6 bars) |
| Control AY6 spray dried | 95.1–96.% | 97 ksi (84–101, 6 bars) | 95 ksi (93–97, 4 bars) | 60 ksi (52–68, 6 bars) |

The Mechanical Strength of Chemically processed PY6 Billets sintered at 1850° C. using 55–60 psi N₂ overpressure follows:

| Sample | Density | MOR Strength ksi | | |
|---|---|---|---|---|
| | | Ambient | 1000° C. | 1200° C. |
| Chemically processed PY6 | 97.0–98.2% | 100 ksi (90–110 ksi 8 bars) | 67 ksi (64–70 ksi 5 bars) | 65 ksi (60– ksi 6 bars) |
| Control PY6 | 98.1% | 100 ksi (90–108 ksi; 5 bars) | 58 ksi (51–65, 3 bars) | — |

Auger analysis of the individual coated particles substantiate that the silicon nitride particles have an essentially uniform coating of the sintering additives yttria and alumina.

| Depth Angstrom | EV | Atomic Percent | | | | | |
|---|---|---|---|---|---|---|---|
| | | C 272 | N 379 | O 510 | AL 1378 | SI 1606 | Y 1746 |
| Pan Dried Sol. Gel Coated (AY6) | | | | | | | |
| 0 | | 7.9 | 10.4 | 48.2 | 7.5 | 9.3 | 16.7 |
| 50 | | 6.9 | 22.3 | 30.1 | 8.4 | 14.6 | 17.7 |
| 100 | | 8.5 | 24.7 | 26.0 | 4.9 | 14.1 | 21.8 |
| 150 | | 8.5 | 19.1 | 16.1 | 6.6 | 16.8 | 33.0 |
| 200 | | 10.3 | 24.2 | 17.3 | 6.8 | 13.0 | 28.4 |
| 250 | | 13.6 | 28.4 | 23.7 | 0.0 | 34.3 | 0.0 |
| Spray Dried Coated (AY6) | | | | | | | |
| 0 | | 8.8 | 11.3 | 45.6 | 3.6 | 12.8 | 18.0 |
| 50 | | 5.8 | 23.2 | 28.7 | 3.6 | 16.4 | 22.3 |
| 100 | | 9.5 | 14.4 | 19.2 | 7.2 | 21.9 | 27.9 |
| 150 | | 6.7 | 13.8 | 12.2 | 9.0 | 18.3 | 40.0 |
| 200 | | 9.9 | 25.2 | 17.8 | 4.8 | 20.8 | 21.4 |
| 250 | | 13.1 | 31.9 | 28.4 | 0.0 | 26.7 | 0.0 |

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for making a densified silicon nitride article comprising:
    Step 1—dispersing silicon nitride particles in a dispersion reagent to form a silicon nitride slurry;
    Step 2—adding a solution of sintering additives to said silicon nitride slurry to form a homogeneous slurry having a pH less than 7;
    Step 3—drying the product from step 2 to form a dried powder having an essentially uniform coating of said sintering additives on said silicon nitride particles;
    Step 4—converting said sintering additives of the product from step 3 to their corresponding oxides;
    Step 5—forming a silicon nitride article from the product of step 4; and
    Step 6—pressureless sintering the product from step 5 at a temperature less than 1700° C. to form a densified silicon nitride article having a density greater than 98 percent of theoretical density.

2. A process in accordance with claim 1 wherein said dispersion agent comprises a solution having a high dielectric constant.

3. A process in accordance with claim 1 wherein said dispersing comprises wet-ball milling.

4. A process in accordance with claim 1 wherein said forming comprises pressing at 20,000 to 50,000 psig.

5. A process for making a densified siliciton nitride article comprising
    Step 1—dispersing silicon nitride particles in a dispersion reagent to form a silicon nitride slurry;
    Step 2—adding a solution of sintering additives to said silicon nitride slurry to form a homogeneous slurry having a pH less than 7;
    Step 3—drying the product from step 2 to form a dried powder having an essentially uniform coating of said sintering additives on said silicon nitride particles;
    Step 4—Converting said sintering additives of the product from step 3 to their corresponding oxides;
    Step 5—forming a silicon nitride articles from the product of step 4; and
    Step 6—pressureless sintering the product from Step 5 at a temperature equal to or less than 1735° C. in nitrogen to form a densified silicon nitride article having a density greater than 99 percent of theoetical density.

6. A process in accordance with claim 1 wherein said sintering additives are selected from the group consisting of soluble salts of yttrium, aluminum, magnesium, lanthanum, cerium, hafnium, zirconium, rare earths, and combinations thereof.

7. A process in accordance with claim 6 wherein said soluble salts comprise nitrates.

8. A process in accordance with claim 1 wherein said forming comprises isostatic pressing.

9. A process in accordance with claim 1 wherein said forming comprises slip casting.

10. A process in accordance with claim 5 wherein said temperature comprises a temperature equal to or less than 1860° C.

11. A process in accordance with claim 1 wherein said dispersion agent comprises a one normal ammonium hydroxide solution containing ammonium citrate and ammonium acetate.

* * * * *